(12) United States Patent
Whitehead et al.

(10) Patent No.: US 11,391,436 B2
(45) Date of Patent: Jul. 19, 2022

(54) PERFORATED ICONS WITH MATCHING LIGHTING

(71) Applicant: INTEVA PRODUCTS, LLC, Troy, MI (US)

(72) Inventors: David Whitehead, Rochester Hills, MI (US); Aidano Nascimento, Oakland, MI (US); Tyler Bame, Clawson, MI (US); David Kovac, Warren, MI (US); Jeffrey Macgregor, Goodrich, MI (US)

(73) Assignee: INTEVA PRODUCTS, LLC, Troy, MI (US)

( * ) Notice: Subject to any disclaimer, the term of this patent is extended or adjusted under 35 U.S.C. 154(b) by 0 days.

(21) Appl. No.: 17/490,773

(22) Filed: Sep. 30, 2021

(65) Prior Publication Data
US 2022/0099270 A1    Mar. 31, 2022

Related U.S. Application Data

(60) Provisional application No. 63/085,590, filed on Sep. 30, 2020.

(51) Int. Cl.
*F21V 3/00*      (2015.01)
*B60Q 3/54*      (2017.01)
*F21Y 115/10*   (2016.01)

(52) U.S. Cl.
CPC .............. *F21V 3/00* (2013.01); *B60Q 3/54* (2017.02); *F21Y 2115/10* (2016.08)

(58) Field of Classification Search
CPC ...... B60Q 3/00–78; B60Q 2500/00–20; B60R 13/02; F21V 3/00; F21V 3/04–08; F21W 2106/00; F21Y 2105/10
See application file for complete search history.

(56) References Cited

U.S. PATENT DOCUMENTS 5,865,302 A * 2/1999 Suzuki .................. H01H 9/182
                                                            200/557

* cited by examiner

*Primary Examiner* — Jason M Han
(74) *Attorney, Agent, or Firm* — Cantor Colburn LLP

(57) ABSTRACT

An illuminated switch for use in a vehicle, including: a switch frame; a skin covering the switch frame; at least one icon defined in the skin by a plurality of openings; and at least one light lens is located between the switch frame and the skin, the at least one light lens having a plurality of posts extending from a surface of the at least one light lens, the plurality of posts being arranged to match a configuration of the at least one icon and the plurality of posts extend into the skin such that they terminate at an outer show surface of the skin such that the plurality of openings will be filled with the plurality of posts.

20 Claims, 4 Drawing Sheets

PERFORATED ICONS WITH MATCHING LIGHTING

CROSS REFERENCE TO RELATED APPLICATIONS

This application claims the benefit of U.S. Provisional Patent Application No. 63/085,590 filed on Sep. 30, 2020, the entire contents of which are incorporated herein by reference thereto.

BACKGROUND

Exemplary embodiments of the present disclosure pertain to the art of illuminated surfaces of a vehicle.

There is a desire to provide "smart surfaces" in vehicle interiors. These "smart surface" may have control surfaces incorporated into the part usually to replace buttons or switches. In addition, there is a desire to have these surfaces be real leather. In order to provide an indication of where to touch these surfaces for a control function to happen, an image or icon is included on that surface.

Accordingly, it is desirable to an improved apparatus and method to illuminate these "smart surfaces".

BRIEF DESCRIPTION

Disclosed is an illuminated switch for use in a vehicle, including: a switch frame; a skin covering the switch frame; at least one icon defined in the skin by a plurality of openings; and at least one light lens is located between the switch frame and the skin, the at least one light lens having a plurality of posts extending from a surface of the at least one light lens, the plurality of posts being arranged to match a configuration of the at least one icon and the plurality of posts extend into the skin such that they terminate at an outer show surface of the skin such that the plurality of openings will be filled with the plurality of posts.

In addition to one or more of the features described above, or as an alternative to any of the foregoing embodiments, the skin is formed from leather.

In addition to one or more of the features described above, or as an alternative to any of the foregoing embodiments, the skin is formed from vinyl or polyurethane.

In addition to one or more of the features described above, or as an alternative to any of the foregoing embodiments, the skin is formed from a thermoplastic olefin.

In addition to one or more of the features described above, or as an alternative to any of the foregoing embodiments, a plurality of icons are defined in the skin by a plurality of openings and a plurality of light lenses are located between the switch frame and the skin, each of the plurality of light lenses having a plurality of posts extending from a surface each one of the plurality of light lenses, the plurality of posts being arranged to match a configuration of a respective one of the plurality of icons, the plurality of posts extend into the skin such that they terminate at the outer show surface of the skin such that the plurality of openings will be filled with the plurality of posts.

In addition to one or more of the features described above, or as an alternative to any of the foregoing embodiments, the skin is formed from leather.

Also disclosed is an illuminated switch for use in a vehicle, including: a switch frame; a skin covering the switch frame; at least one icon defined in the skin by a plurality of openings; and at least one light lens is located between the switch frame and the skin, the at least one light lens having a plurality of posts extending from a surface of the at least one light lens, the plurality of posts being arranged to match a configuration of the at least one icon and the plurality of posts extend into the skin such that they terminate at an outer show surface of the skin such that the plurality of openings will be filled with the plurality of posts, wherein the at least one light lens is applied as a liquid material to a backside of the skin.

In addition to one or more of the features described above, or as an alternative to any of the foregoing embodiments, the skin is formed from leather.

In addition to one or more of the features described above, or as an alternative to any of the foregoing embodiments, the skin is formed from vinyl or polyurethane.

In addition to one or more of the features described above, or as an alternative to any of the foregoing embodiments, the skin is formed from a thermoplastic olefin.

In addition to one or more of the features described above, or as an alternative to any of the foregoing embodiments, a plurality of icons are defined in the skin by a plurality of openings and a plurality of light lenses are located between the switch frame and the skin, each of the plurality of light lenses having a plurality of posts extending from a surface each one of the plurality of light lenses, the plurality of posts being arranged to match a configuration of a respective one of the plurality of icons, the plurality of posts extend into the skin such that they terminate at the outer show surface of the skin such that the plurality of openings will be filled with the plurality of posts.

In addition to one or more of the features described above, or as an alternative to any of the foregoing embodiments, the skin is formed from leather.

In addition to one or more of the features described above, or as an alternative to any of the foregoing embodiments, the skin is formed from vinyl or polyurethane.

Also disclosed is a method for locating a plurality of light emitting protrusions in a skin of a surface of a vehicle interior, including: defining at least one icon in the skin by a plurality of openings that extend completely through the skin; applying a barrier film to an outer show surface of the skin; forming at least one light lens on a backside of the skin by applying a liquid material to the back side of the skin such that the liquid material forms a plurality of posts extending that match a configuration of the at least one icon and the plurality of posts extend into the skin such that they terminate at the outer show surface of the skin such that the plurality of openings will be filled with the plurality of posts; and removing the barrier film after the liquid material has cured.

In addition to one or more of the features described above, or as an alternative to any of the foregoing embodiments, the skin is formed from leather.

In addition to one or more of the features described above, or as an alternative to any of the foregoing embodiments, the skin is formed from vinyl or polyurethane.

In addition to one or more of the features described above, or as an alternative to any of the foregoing embodiments, the skin is formed from a thermoplastic olefin.

In addition to one or more of the features described above, or as an alternative to any of the foregoing embodiments, a plurality of icons are defined in the skin by a plurality of openings and a plurality of light lenses are formed on the backside of the skin, each of the plurality of light lenses having a plurality of posts extending from a surface each one of the plurality of light lenses, the plurality of posts being arranged to match a configuration of a respective one of the plurality of icons, the plurality of posts extend into the skin such that they terminate at the outer show surface of the skin such that the plurality of openings will be filled with the plurality of posts.

In addition to one or more of the features described above, or as an alternative to any of the foregoing embodiments, the skin is formed from leather.

In addition to one or more of the features described above, or as an alternative to any of the foregoing embodiments, the skin is formed from vinyl or polyurethane.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

For many applications it is required that a symbol or icon be illuminated to assist the user in finding the control image. In order to do this one or more openings may be cut through the leather of this surface. These openings form a shape or image of a desired icon.

In addition and in order to see these icons or symbols, light is directed to the back side of the part so that the cut outs create an illuminated image of the icon. However, over time debris and grime will find its way into the perforated holes and the appearance of the part may be diminished. Also, given the size and location of these holes, they will be very difficult to clean. Therefore, it is desirable to prevent dirt and debris from entering these holes without adversely affecting the illumination provided. Another problem of using small cut outs to allow light to pass through is that the light becomes very directional. That is, the image can be seen much better when viewed directly on than from an angle.

The present disclosure is directed to using light transmitting components (light lenses or light pipes) to direct light to the cut outs (perforations). These components also have protrusions on them that match the cut outs in the leather. These protrusions (often posts) extend into the leather completely (or partially) filling the cut outs in the leather (skin material, plastic roll goods, etc.). By filling the cutouts in the skin material with material from the lenses (light pipe) dirt and grime cannot enter the cut out, and overall the control area will be easier to clean. In addition the protrusions (posts) on the light lens (light pipe) convey the light all the way to the surface of the leather. As such, off angled viewing of the illuminated icon is greatly improved, as is the overall appearance.

These illuminated icons may be used with capacitive based smart surfaces for switching functions. Furthermore, the control images (or icons) can be clearly visible when needed and will require illumination. Finally, it is desirable to use these icons with real leather or an suitable alternative such as imitation leather, vinyl, polyurethane, thermoplastic elastomer (TPE), thermoplastic olefin (TPO), plastic rolled goods or any other equivalent material. As such, it is desirable to provide a method to prevent dirt and grime from entering the cut outs. The concept to fill the cutouts with material from the light lens is a key enabler to smart surfaces using leather. It can also be applied to these applications where plastic roll goods are used.

Smart surface applications that wrap a skin over a hard substrate can use the present disclosure.

Figure 1:
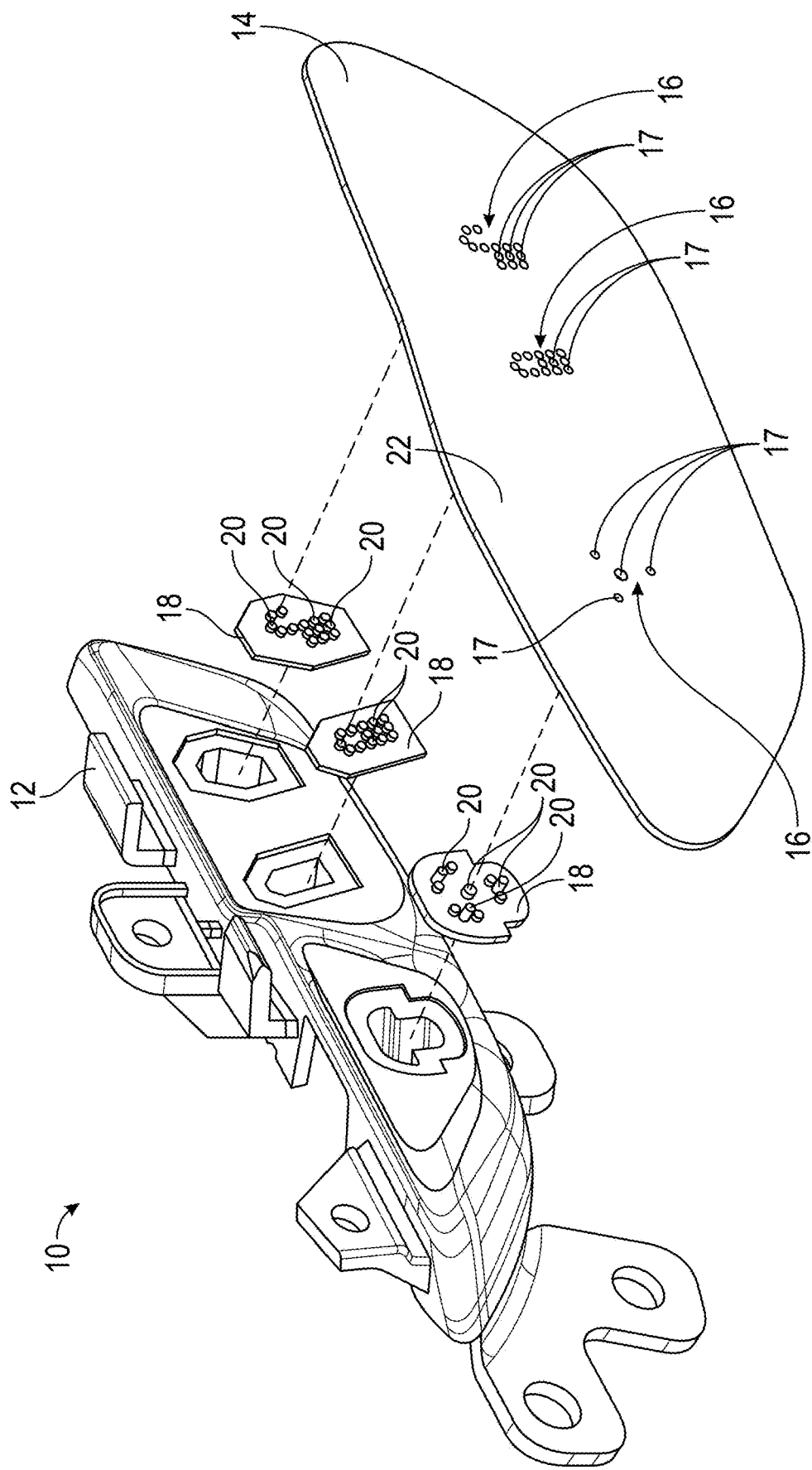
FIG. 1 is an exploded view of a switch frame with a plurality of light lens with light post that extend into perforations in a covering layer.
Figure 2:
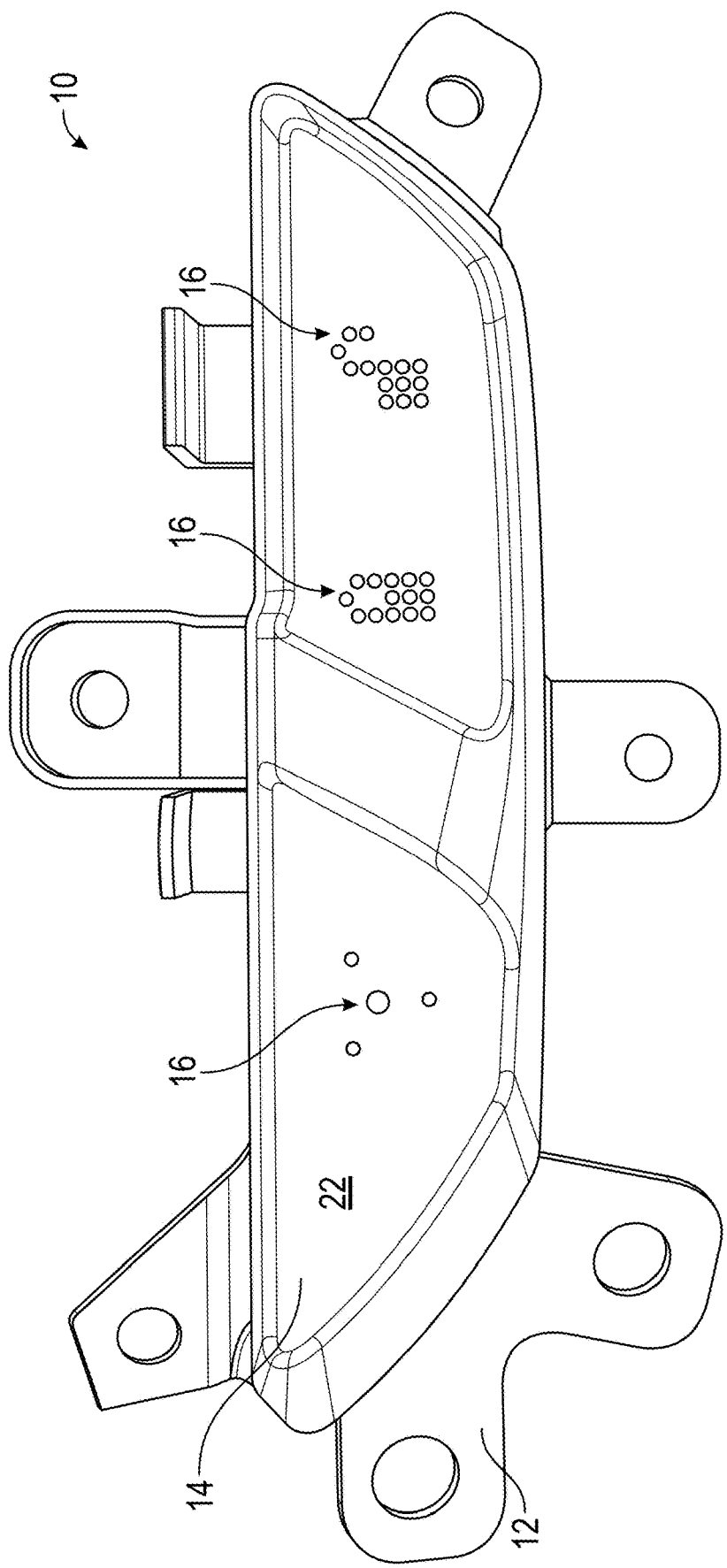
FIG. 2 is a view of the switch frame illustrated in FIG. 1.

Referring now to FIGS. 1 and 2, a switch 10 using an embodiment of the present disclosure is illustrated. The switch 10 includes a switch frame 12 that is covered by a skin or outer layer 14, which in one embodiment may be leather. The skin or outer layer 14 is configured to have a plurality of icons 16 that are defined by a plurality of openings 17 that extend completely through the skin or outer layer 14. Alternatively, there is at least one icon 16 provided by a plurality of openings 17. In order to provide illumination to the icons 16 a plurality of light lenses 18 are provided or at least one light lens 18 is provided. Each light lens 18 is formed from a translucent or transparent material that has a plurality of posts or protrusions 20 extending from a surface of the light lens 18. The plurality of posts are arranged to match the configuration of a corresponding icon in the skin or outer layer 14 such that the post or protrusions extend into the skin or outer layer 14 such that they terminate at an outer show surface 22 of the skin or outer layer 14 such that the openings will not be filled with dirt or grime.

Each of the light lenses 18 are illuminated with a source of light (not shown) such as a light emitting diode (LED) or other shown of light. The light will travel through the light lenses to the protrusions 20 and through the openings defining icons 16. Although a specific configuration is illustrated in FIGS. 1 and 2, various embodiments of the present disclosure are not limited to the specific switch configuration illustrated in at least FIGS. 1 and 2.

Figure 3:
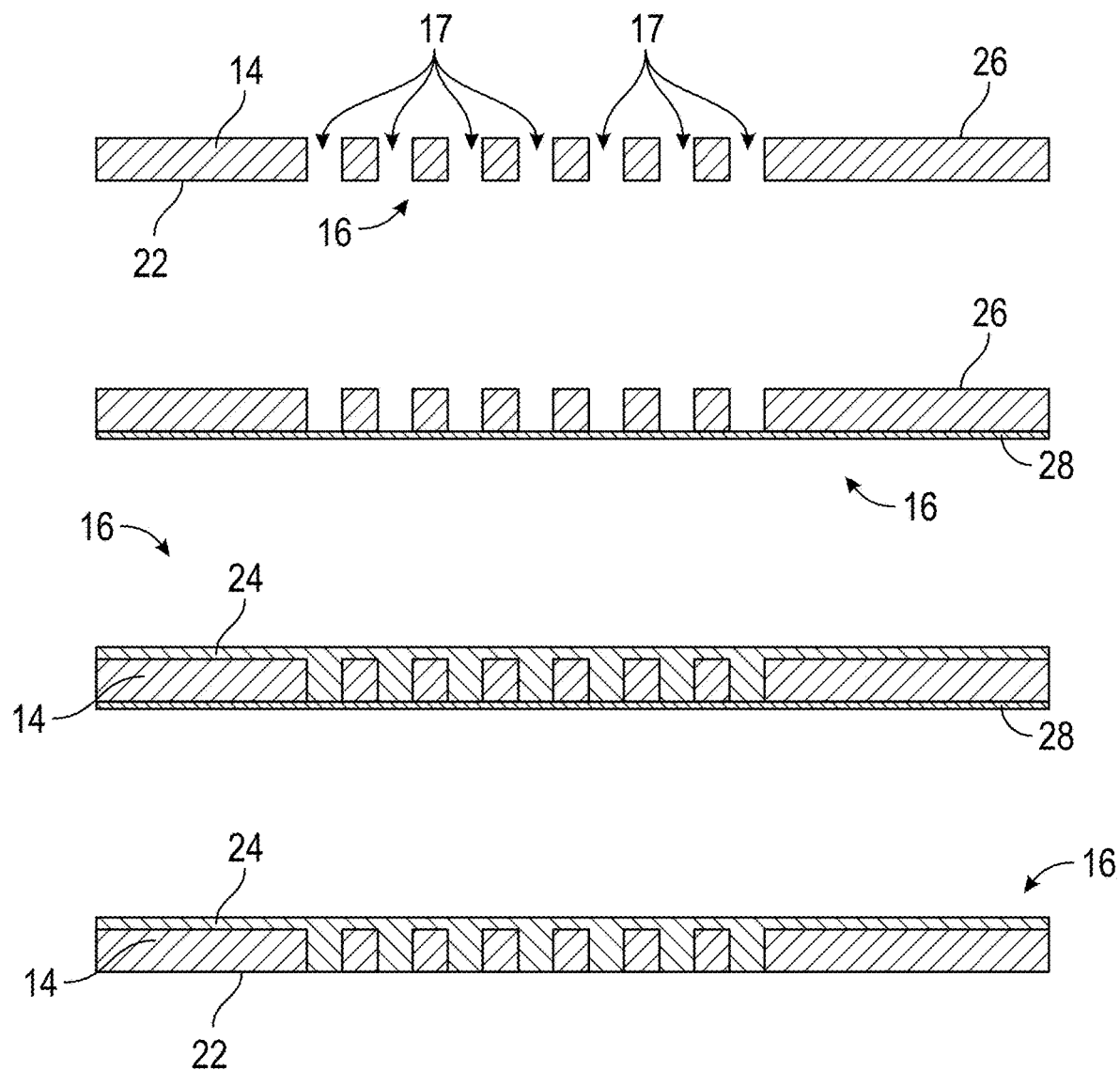
FIG. 3 illustrates an alternative embodiment for illuminating a perforated covering layer.
Figure 4:
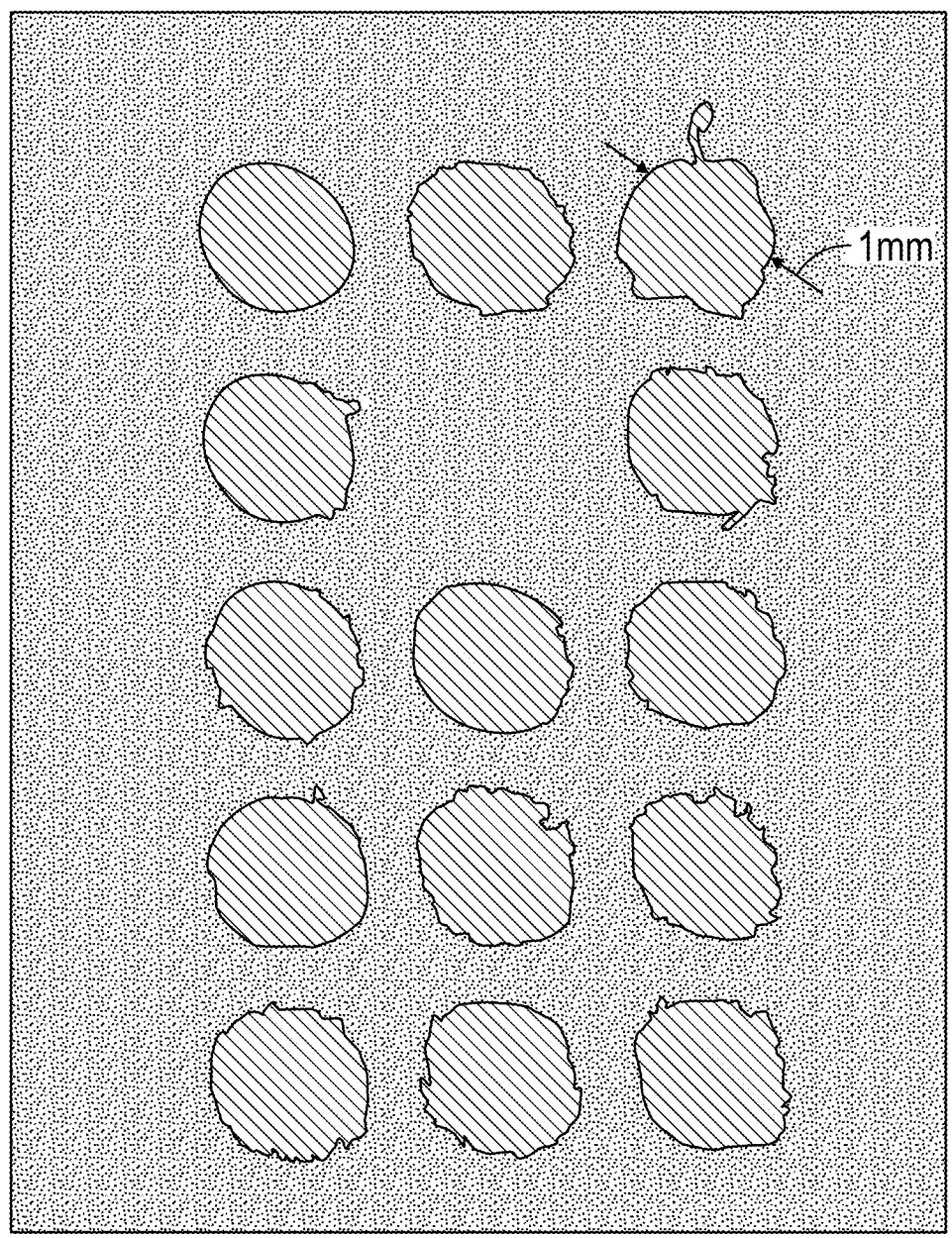
FIG. 4 is a top view of the embodiment of FIG. 3.

Referring now to FIGS. 3 and 4 an alternative embodiment of the present disclosure is illustrated. Here a plurality of openings 17 in cover 14 are partially or fully filled with a translucent or clear polymer 24 that is applied to a backside 26 of the cover 14. In order to prevent the translucent or clear polymer 24 from passing completely through openings 17 a removable barrier film 28 is applied to the front surface 22 of the cover 14. Once the translucent or clear polymer 24 has cured the removable barrier film 28 is removed from the cover 14.

By filling the cutouts or openings 17 in the skin material 14 with the polymer dirt and grime cannot enter the cutout or opening 17, and overall the control area will be easier to clean. In addition the polymer in the filled perforations conveys light all the way to the surface 22 of the leather cover 14. As such, off angled viewing of the illuminated icon is greatly improved, as is the overall appearance.

Although a specific configuration is illustrated in FIGS. 3 and 4, various embodiments of the present disclosure are not limited to the specific configuration illustrated in at least FIGS. 3 and 4.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An illuminated switch for use in a vehicle, comprising:
   a switch frame;
   a skin covering the switch frame;
   at least one icon defined in the skin by a plurality of openings; and
   at least one light lens is located between the switch frame and the skin, the at least one light lens having a plurality of posts forming a matrix pattern and extending from a surface of the at least one light lens, the plurality of posts being arranged to match a configuration of the at least one icon and the plurality of posts extend into the skin such that they terminate at an outer show surface of the skin such that the plurality of openings will be filled with the plurality of posts.

2. The illuminated switch as in claim 1, wherein the skin is formed from leather.

3. The illuminated switch as in claim 1, wherein the skin is formed from vinyl or polyurethane.

4. The illuminated switch as in claim 1, wherein the skin is formed from a thermoplastic olefin.

5. The illuminated switch as in claim 1, wherein a plurality of icons are defined in the skin by a plurality of openings and a plurality of light lenses are located between the switch frame and the skin, each of the plurality of light lenses having a plurality of posts extending from a surface each one of the plurality of light lenses, the plurality of posts being arranged to match a configuration of a respective one of the plurality of icons, the plurality of posts extend into the skin such that they terminate at the outer show surface of the skin such that the plurality of openings will be filled with the plurality of posts.

6. The illuminated switch as in claim 5, wherein the skin is formed from leather.

7. An illuminated switch for use in a vehicle, comprising:
   a switch frame;
   a skin covering the switch frame;
   at least one icon defined in the skin by a plurality of openings; and
   at least one light lens is located between the switch frame and the skin, the at least one light lens having a plurality of posts forming a matrix pattern and extending from a surface of the at least one light lens, the plurality of posts being arranged to match a configuration of the at least one icon and the plurality of posts extend into the skin such that they terminate at an outer show surface of the skin such that the plurality of openings will be filled with the plurality of posts, wherein the at least one light lens is applied as a liquid material to a backside of the skin.

8. The illuminated switch as in claim 7, wherein the skin is formed from leather.

9. The illuminated switch as in claim 7, wherein the skin is formed from vinyl or polyurethane.

10. The illuminated switch as in claim 7, wherein the skin is formed from a thermoplastic olefin.

11. The illuminated switch as in claim 7, wherein a plurality of icons are defined in the skin by a plurality of openings and a plurality of light lenses are located between the switch frame and the skin, each of the plurality of light lenses having a plurality of posts extending from a surface each one of the plurality of light lenses, the plurality of posts being arranged to match a configuration of a respective one of the plurality of icons, the plurality of posts extend into the skin such that they terminate at the outer show surface of the skin such that the plurality of openings will be filled with the plurality of posts.

12. The illuminated switch as in claim 11, wherein the skin is formed from leather.

13. The illuminated switch as in claim 11, wherein the skin is formed from vinyl or polyurethane.

14. A method for locating a plurality of light emitting protrusions in a skin of a surface of a vehicle interior, comprising:
    defining at least one icon in the skin by a plurality of openings that extend completely through the skin;
    applying a barrier film to an outer show surface of the skin;
    forming at least one light lens on a backside of the skin by applying a liquid material to the back side of the skin such that the liquid material forms a plurality of posts extending in a matrix pattern that match a configuration of the at least one icon and the plurality of posts extend into the skin such that they terminate at the outer show surface of the skin such that the plurality of openings will be filled with the plurality of posts; and
    removing the barrier film after the liquid material has cured.

15. The method as in claim 14, wherein the skin is formed from leather.

16. The method as in claim 14, wherein the skin is formed from vinyl or polyurethane.

17. The method as in claim 14, wherein the skin is formed from a thermoplastic olefin.

18. The method as in claim 14, wherein a plurality of icons are defined in the skin by a plurality of openings and a plurality of light lenses are formed on the backside of the skin, each of the plurality of light lenses having a plurality of posts extending from a surface each one of the plurality of light lenses, the plurality of posts being arranged to match a configuration of a respective one of the plurality of icons, the plurality of posts extend into the skin such that they terminate at the outer show surface of the skin such that the plurality of openings will be filled with the plurality of posts.

19. The method as in claim 18, wherein the skin is formed from leather.

20. The method as in claim 18, wherein the skin is formed from vinyl or polyurethane.

* * * * *